United States Patent
Vogel et al.

(10) Patent No.: US 10,628,893 B1
(45) Date of Patent: Apr. 21, 2020

(54) STAGED TRANSACTIONS IN FINANCIAL MANAGEMENT APPLICATION

(71) Applicants: Peter Allen Vogel, Santa Clara, CA (US); Jennifer A. Martin, Los Altos, CA (US); Tyler Riding, Mountain View, CA (US); Shyam P. Nukala, Santa Clara, CA (US)

(72) Inventors: Peter Allen Vogel, Santa Clara, CA (US); Jennifer A. Martin, Los Altos, CA (US); Tyler Riding, Mountain View, CA (US); Shyam P. Nukala, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 320 days.

(21) Appl. No.: 14/745,352

(22) Filed: Jun. 19, 2015

(51) Int. Cl.
| | | |
|---|---|---|
| G06Q 40/00 | (2012.01) | |
| H04W 4/24 | (2018.01) | |
| G07B 17/00 | (2006.01) | |
| G06Q 10/10 | (2012.01) | |
| G06Q 30/06 | (2012.01) | |

(52) U.S. Cl.
CPC ... G06Q 40/12 (2013.12); *G07B 2017/00427* (2013.01); *H04T 2001/215* (2013.01); *H04W 4/24* (2013.01)

(58) Field of Classification Search
CPC ............................ G06Q 40/12; G06Q 40/02
See application file for complete search history.

(56) References Cited

U.S. PATENT DOCUMENTS

| | | | | |
|---|---|---|---|---|
| 6,487,594 B1* | 11/2002 | Bahlmann | .......... | G06Q 30/0601 705/26.1 |
| 7,590,669 B2* | 9/2009 | Yip | ...................... | H04L 41/0816 |
| 8,078,508 B1* | 12/2011 | Shieh | ................... | G06Q 20/207 705/19 |
| 8,504,428 B1* | 8/2013 | Houghtaling | .......... | G06Q 20/12 705/16 |
| 9,792,603 B1* | 10/2017 | Gailloux | ............ | G06Q 20/3227 |
| 2004/0139016 A1* | 7/2004 | Forzley | ................. | G06Q 20/00 705/40 |
| 2005/0071512 A1* | 3/2005 | Kim | ...................... | G06Q 20/341 710/1 |
| 2006/0229958 A1* | 10/2006 | Sergio | .................... | G06Q 10/10 705/35 |
| 2009/0076951 A1* | 3/2009 | Szamel | .................. | G06O 20/10 705/39 |
| 2010/0318926 A1* | 12/2010 | Anderson | .............. | G06Q 40/12 715/763 |
| 2013/0080301 A1* | 3/2013 | Siauw | .................... | G06Q 40/02 705/30 |

(Continued)

*Primary Examiner* — Asfand M Sheikh
*Assistant Examiner* — Avia Salman
(74) *Attorney, Agent, or Firm* — Ferguson Braswell Fraser Kubasta PC

(57) ABSTRACT

A method, system, and computer readable medium to process transaction records obtained from electronic commerce applications (ECAs) as staged transactions before posting to an accounting ledger in a financial management application (FMA). In this manner, the user (e.g., small business owner, book keeper, or accountant), the ECA developer, and the FMA provider are allowed to focus on their respective domain knowledge while allowing the financial management application, augmented by user-defined rules that are appropriate to the business in question, to automate the accounting ledger posting.

17 Claims, 5 Drawing Sheets

(56) References Cited

U.S. PATENT DOCUMENTS

| | | | |
|---|---|---|---|
| 2013/0159148 A1* | 6/2013 | Sykora | G06Q 40/06 705/30 |
| 2014/0114816 A1* | 4/2014 | Greef | G06Q 40/12 705/30 |
| 2014/0164194 A1* | 6/2014 | Landry, Jr. | G06Q 10/10 705/30 |

* cited by examiner

Standard Transaction Record 155

| Date 155a | Amount 155b | Description 155c |
|---|---|---|

Staged Transaction Record 153

| Date 153a | Amount 153b | ECA-specific Content 153c |
|---|---|---|
| Target Account 153x | P/L Account 153y | Transaction Type 153z | Class/ Location 153w |

Posted Transaction Record A 144

| Date 144a | Amount 144b |
|---|---|
| Target Account 144x | P/L Account 144y | Transaction Type 144z | Class/ Location 144w |

FIG. 1B

Screenshot 300

XYZ eCommerce Payment Service

Update | Add account

Checking
$1,190.00
Bank Balance    113 days ago $38,763.14
In Quickbooks

> Go to Register

| New Transactions 311 | Posted Transactions 312 | Excluded Transactions 313 |

Batch Actions | All (33) | Recognized (3)

Staged Transaction 301

| Date | Description | Category Or Match | Spent | Received | Action |
|---|---|---|---|---|---|
| 2/20/2013 | USAA.Com Payment | ??? Insurance- Liability | $1,757.15 | | Action |
| 4/04/2014 | USAA.COM Payment Credit Card 12 | ??? Insurance- Liability | $493.61 | | Add |
| 5/01/2014 | USAA.COM Payment Credit Card 14 | ??? Insurance- Liability | $196.64 | | Add |
| 4/22/2014 | Bill Pay Truckee Donner P On-Lin | Uncategorized Expense | $116.05 | | Add |
| 5/16/2014 | ABC Manufacturing Direct DEP 140 | Sales of Product Income | | $1,200.00 | Add |
| Date Column 310 | Description Column 320 | Category/Match Column 330 | Amount Column 340 | | Action Column 350 |

FIG. 3

STAGED TRANSACTIONS IN FINANCIAL MANAGEMENT APPLICATION

BACKGROUND

Electronic commerce, commonly known as e-commerce or eCommerce, is trading in products or services using computer networks, such as the Internet. Electronic commerce draws on technologies such as mobile commerce, mobile commerce, electronic funds transfer, supply chain management, Internet marketing, online transaction processing, electronic data interchange (EDI), inventory management systems, and automated data collection systems. In particular, modern eCommerce typically uses the World Wide Web for at least one part of the transaction's life cycle. In recent years, there has been an explosive growth of eCommerce financial solutions provided by eCommerce financial institutions and third parties to facilitate various stages of settling eCommerce trades.

Many accounting applications offer application programming interfaces (APIs) to enable integration with eCommerce solutions by third parties. Using these APIs often requires the third party to have an intimate knowledge of the accounting structure of the accounting application, or to engage an accountant to help define the behavior of the integration and force a confusing and sometimes lengthy "Setup" process for the business user to customize how data will flow from the third party solution into the accounting application. This presents a tremendous challenge to business users and third party developers due to the explosive growth of eCommerce financial solutions.

SUMMARY

In general, in one aspect, the invention relates to a method for generating a financial document using a financial management application (FMA). The method includes obtaining, from a first electronic commerce application (ECA), a plurality of transaction records of a user, wherein a first transaction record of the plurality of transaction records comprises a first date, a first amount, and a first ECA-specific content, selecting, based on a type of the first ECA, an ECA-specific transaction record analysis rule from a plurality of transaction record analysis rules, analyzing, based on the ECA-specific transaction record analysis rule, the first ECA-specific content to generate a first attribute of the first transaction record, storing the plurality of transaction records in a staged transaction queue, wherein the first transaction record is stored in conjunction with the first attribute, displaying, by the FMA in response to a user request, the staged transaction queue for user review, wherein the first transaction record is displayed in conjunction with the first attribute, generating, based on a user approval in response to the user review, a first posted transaction record from the first transaction record, wherein the first posted transaction record is posted in an accounting ledger of the user and comprises the first date, the first amount, and the first attribute, and generating, by the FMA, the financial document based at least on the first posted transaction record.

In general, in one aspect, the invention relates to a system that includes a computer processor, a financial management application (FMA) executing on the computer processor and configured to generate a financial document, wherein the FMA include (i) a rule based analyzer configured to obtain, from a first electronic commerce application (ECA), a plurality of transaction records of a user, wherein a first transaction record of the plurality of transaction records comprises a first date, a first amount, and a first ECA-specific content, select, based on a type of the first ECA, an ECA-specific transaction record analysis rule from a plurality of transaction record analysis rules, analyze, based on the ECA-specific transaction record analysis rule, the first ECA-specific content to generate a first attribute of the first transaction record, and store the plurality of transaction records in a staged transaction queue, wherein the first transaction record is stored in conjunction with the first attribute, (ii) a user review module configured to display, in response to a user request, the staged transaction queue for user review, wherein the first transaction record is displayed in conjunction with the first attribute, and (iii) a business logic module configured to generate, based on a user approval in response to the user review, a first posted transaction record from the first transaction record, wherein the first posted transaction record is posted in an accounting ledger of the user and comprises the first date, the first amount, the first description, and the first attribute, and a repository configured to store the staged transaction queue, the accounting ledger of the user, and the plurality of transaction record analysis rules.

In general, in one aspect, the invention relates to a non-transitory computer readable medium storing instructions for generating a financial document using a financial management application (FMA). The instructions, when executed by a computer processor, include functionality for obtaining, from a first electronic commerce application (ECA), a plurality of transaction records of a user, wherein a first transaction record of the plurality of transaction records comprises a first date, a first amount, and a first ECA-specific content, selecting, based on a type of the first ECA, an ECA-specific transaction record analysis rule from a plurality of transaction record analysis rules, analyzing, based on the ECA-specific transaction record analysis rule, the first ECA-specific content to generate a first attribute of the first transaction record, storing the plurality of transaction records in a staged transaction queue, wherein the first transaction record is stored in conjunction with the first attribute, displaying, by the FMA in response to a user request, the staged transaction queue for user review, wherein the first transaction record is displayed in conjunction with the first attribute, generating, based on a user approval in response to the user review, a first posted transaction record from the first transaction record, wherein the first posted transaction record is posted in an accounting ledger of the user and comprises the first date, the first amount, and the first attribute, and generating, by the FMA, the financial document based at least on the first posted transaction record.

Other aspects of the invention will be apparent from the following transaction description and the appended claims.

BRIEF DESCRIPTION OF DRAWINGS

FIGS. 1A and 1B show a block diagram of a system in accordance with one or more embodiments of the invention.

FIG. 3 shows an example in accordance with one or more embodiments of the invention.

DETAILED DESCRIPTION

Figure 1A:
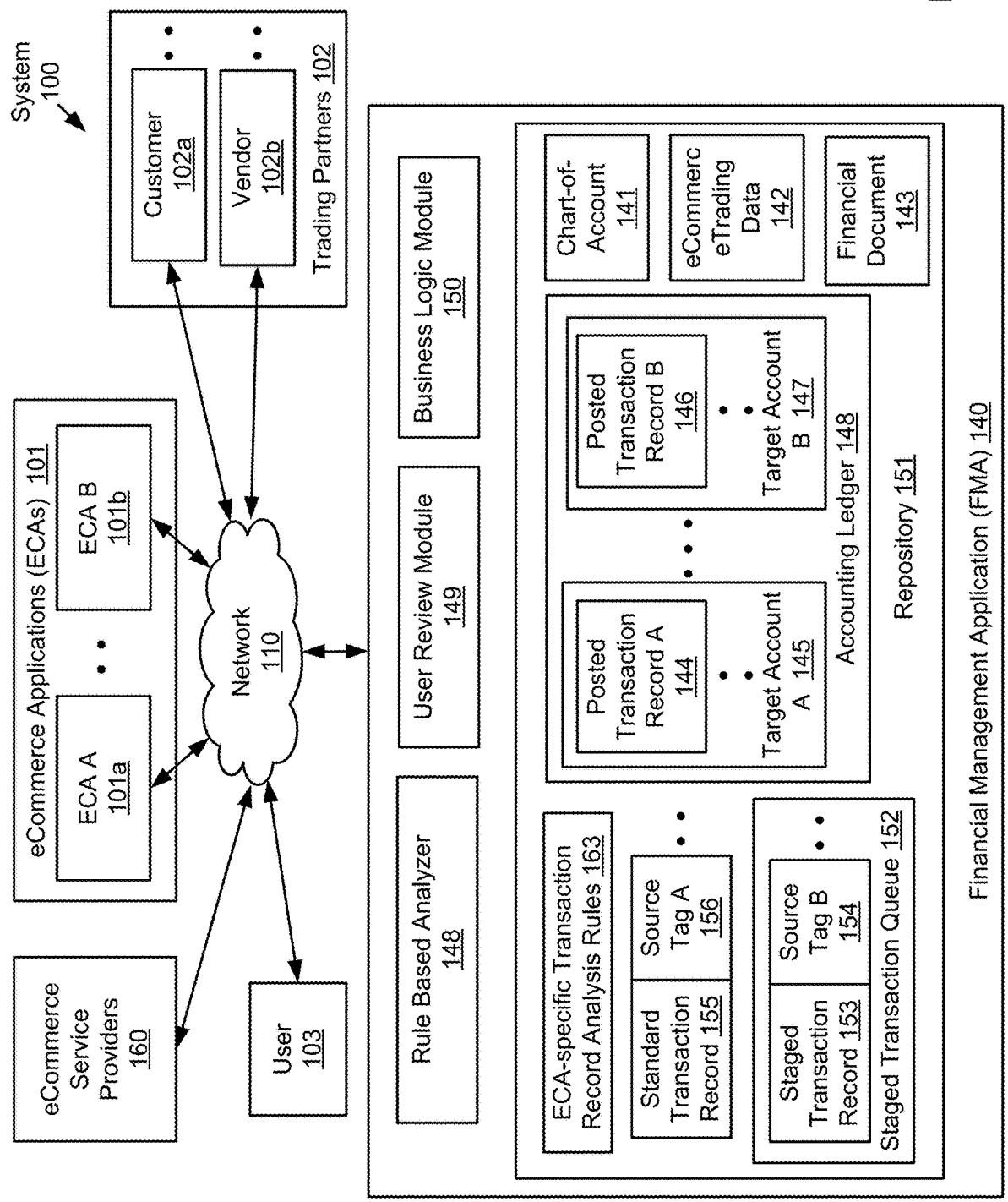

Specific embodiments of the invention will now be described in detail with reference to the accompanying figures. Like elements in the various figures are denoted by like reference numerals for consistency. Further, in the figures, three collinear dots mean that more elements of the same type as before the three collinear dots may optionally exist in accordance with one or more embodiments of the invention.

In the following detailed transaction description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the transaction description.

In general, embodiments of the invention provide a method, system, and computer readable medium to process transaction records obtained from electronic commerce applications (ECAs) as staged transactions before posting to an accounting ledger in a financial management application (FMA). In this manner, the user (e.g., small business owner, book keeper, or accountant), the ECA developer, and the FMA provider are allowed to focus on their respective domain knowledge while allowing the financial management application, augmented by user-defined rules that are appropriate to the business in question, to automate the accounting ledger posting.

FIG. 1A shows a block diagram of a system (100) in accordance with one or more embodiments of the invention. Specifically, the system (100) includes a user (103), trading partners (102) (e.g., customer (102a), vendor (102b)) of the user (103), a financial management application (FMA) (140) used by the user (103), eCommerce applications (ECAs) (101) (e.g., ECA A (101a), ECA B (101b), etc.), and eCommerce service providers (160) that are coupled via a network (110). Further, the FMA (140) includes a rule based analyzer (148), a user review module (149), a business logic module (150), and a repository (151) which stores data used and/or generated by the rule based analyzer (148), the user review module (149), and the business logic module (150). In one or more embodiments of the invention, the network (110) may include a cellular phone network, a wide area network, a local area network, a public switched telephone network (PSTN), a financial network, any other suitable network that facilitates the exchange of information from one part of the network to another, or a combination thereof. In one or more embodiments, the network (110) is coupled to or overlaps with the Internet. In one or more embodiments of the invention, one or more of the modules and elements shown in FIG. 1A may be omitted, repeated, and/or substituted. Accordingly, embodiments of the invention should not be considered limited to the specific arrangements of modules shown in FIG. 1A.

In one or more embodiments of the invention, the user (103) is a business entity engaged in the trade of goods, services, or both to customers (e.g., customers (102a)), such as an individual consumer or business consumer. In particular, an individual consumer is a person or group (e.g., family or other organization) that consumes goods and/or services. A business consumer is a business that consumes goods and/or services. In one or more embodiments of the invention, the business entity may be a sole proprietorship, partnership, company, non-profit organization, etc. For example, the business entity may have a storefront located in at least one physical location. Alternatively or additionally, the business entity may correspond to an Internet business that has an associated website (referred to as an online store). In one or more embodiments, the goods and/or services sold by the business entity correspond to the merchandise sold by the business entity to the customers (e.g., customer (102a)).

In one or more embodiments of the invention, the user (103) purchases goods and/or services that are modified or enhanced by the corresponding business entity for reselling to the customers (e.g., customer (102a)). For example, the business entity may purchase the goods and/or services from vendors (e.g., vendor (102b)), such as a manufacturer, a distributor, or other suppliers. In one or more embodiments, the goods and/or services purchased by the business entity correspond to the merchandise purchased by the business entity from the vendors (e.g., vendor (102b)). Further, as used herein, the business entity is deemed to perform an action when the action is performed on behalf of the business entity. For example, an owner, agent, or officer may act on behalf of the business entity to perform an action. In one or more embodiments, the user (103) may include a computing device configured with computing, data storage, and network communication functionalities. For example, the user (103) may use the computing device (not shown) to access the FMA (140) to manage business financial information, such as information related to selling goods and/or services to the customers (e.g., customer (102a)) and/or purchasing goods and/or services from the vendors (e.g., vendor (102b)).

In one or more embodiments of the invention, the user (103) includes functionality to perform one or more financial transactions with one or more customers and one or more vendors. In one or more embodiments, a financial transaction is a payment associated with the aforementioned trade of goods and/or services. Such financial transactions may be performed to settle a sale of a merchandise item, a purchase of a merchandise item, a return of a merchandise item, a down payment on a merchandise item, or any other related fees. In one or more embodiments, the financial transactions may further include payroll payments to employees, contractors, or other human resources of the business entity, tax and/or licensing payments to regulatory agencies/organizations, capital spending with respect to equipment/machineries, short term and/or long term loan payments, etc.

In one or more embodiments of the invention, the ECAs (101) (e.g., ECA A (101a), ECA B (101b), etc.) and the eCommerce service providers (160) are used by the user (103) and/or the trading partners (102) to perform the aforementioned financial transactions. For example, the eCommerce service providers may include eCommerce merchants, banks, credit card service providers, electronic payment service providers, etc. The ECAs (101) may include a shopping cart embedded in an eCommerce website, a point of sale application, an electronic payment application, or other 3rd party eCommerce applications for the eCommerce service providers (160). Generally, a financial transaction is represented by a transaction record. In one or more embodiments, the transaction record is information generated and/or recorded by the ECAs (100) or eCommerce service providers (160) regarding the financial transaction. Each transaction record includes a date, a payment amount, and a description. The transaction description describes the financial transaction and may be a concatenation of various components, such as a basic description and additional extended information. For example, the transaction description may include information about the payer and payee of the financial transaction (e.g., user (103), customer (102a), vendor (102b), etc.), such as a full or abbreviated name, a location, a store identifier, all or part of a web address, etc. The transaction description may further include information about the merchandise, such as a name, description, other identifier of the merchandise, etc.

In one or more embodiments of the invention, the FMA (140) is a set of software solutions designed to manage the aforementioned trades, other financial activities, and associated financial transactions of the user (103). In one or more embodiments of the invention, the FMA (140) is an accounting software. In one or more embodiments, the FMA (140) is provided by an application service provider, such as a software as a service (SaaS). For example, the FMA (140) may be operated by the application service provider (ASP) and accessed by the user (103) on a subscription basis.

In one or more embodiments of the invention, the FMA (140) obtains the transaction records from the eCommerce service providers (160) and the ECAs (101) to facilitate the management of the aforementioned trades, other financial activities, and associated financial transactions of the user (103). In one or more embodiments, the FMA (140) downloads the transaction records from the eCommerce service providers (160). In one or more embodiments, the ECAs (101) pushes the transaction records to the FMA (140), e.g., using one or more application interfaces (APIs) of the FMA (140). In one or more embodiments, the obtained transaction records includes standard transaction records (e.g., standard transaction record (155)) and staged transaction records (e.g., staged transaction record (153)) that are stored in the repository (151). In one or more embodiments, each transaction record is assigned a source tag (e.g., source tag A (156), source tag B (154)) to identify the source or a type of the source from which the transaction record is obtained.

In one or more embodiments of the invention, the standard transaction record includes a date, an amount, and a basic description. Typically, financial transaction records downloaded from a bank or other financial institutions are in the form of the standard transaction record. For example, the standard transaction record (155) may be downloaded from a bank and is tagged with the source type A (156) that identifies the bank as the download source.

In one or more embodiments of the invention, transaction records pushed from certain ECAs (e.g., PayPal™, Amex™, etc.) include extended information in addition to the basic description in the standard transaction record. For example, the additional extended information may include customer or vendor information, tax amount, discount, transaction geo-location, etc. In one or more embodiments, the additional extended information is pushed to the FMA (140) based on a list of the data fields defined in the APIs. However, the completeness of the additional extended information vary and depend on the particular ECA. For example, the additional extended information may correspond to a particular incomplete portion of the list of defined data fields depending on the particular ECA. In this context, the additional extended information is referred to as the ECA-specific content.

In one or more embodiments of the invention, transaction records containing ECA-specific contents are stored in the staged transaction queue (152) as staged transaction records (e.g., staged transaction record (153)). In one or more embodiments, each staged transaction record is pushed individually from the ECAs (101). In one or more embodiments, multiple staged transaction records are pushed in a batch from the ECAs (101).

In one or more embodiments of the invention, the FMA (140) includes the rule based analyzer (148) that is configured to extract and/or infer one or more transaction attributes from the ECA-specific content of each staged transaction record. In one or more embodiments, the transaction attribute includes a transaction type, a target account, a profit/loss account, a class, a location, an auto-accept status, and a billable status of the first transaction record. In particular, the transaction type, target account, profit/loss account, class, location, auto-accept status, and billable status correspond to the data fields defined by the aforementioned APIs of the FMA (140). In one or more embodiments, a particular transaction attribute is included in the ECA-specific content by the ECA and is extracted based on the ECA-specific transaction record analysis rules (163). In one or more embodiments, a particular transaction attribute is not included in the ECA-specific content by the ECA and is inferred based on the ECA-specific transaction record analysis rules (163). For example, the staged transaction record (153) is tagged with the source tag B (154) that identifies the ECA B (101b) as the source from which the staged transaction record (153) is obtained. Accordingly, one or more rules corresponding to the ECA B (101b) are selected from the ECA-specific transaction record analysis rules (163) based on the source tag B (154). The selected rules are then used by the rule based analyzer (148) to extract and/or infer the transaction attributes from the staged transaction record (153).

In one or more embodiments of the invention, the rule based analyzer (148) is further configured to analyze the ECA-specific content of each staged transaction record to determine whether the staged transaction record requires user review before being posted in the accounting ledger (148). An example of extracting the transaction attributes and determining whether the user review is required for posting is described in reference to TABLE 3 through TABLE 6 below.

In one or more embodiments of the invention, the FMA (140) includes the user review module (149) that is configured to display the transaction records in a user interface window for user review before posting in an accounting ledger (148). Specifically, the transaction records and extracted transaction attributes in the staged transaction queue (152) are displayed in the user interface window, referred to as a user review window, for user review. An example of displaying the staged transaction queue (152) for user review is described in reference to FIG. 3 below.

In one or more embodiments of the invention, the FMA (140) includes the business logic module (150) that is configured to track the aforementioned trades using eCommerce trading data (142), which is recorded information describing the purchase or sale of goods/services between the user (103) and the trading partners (102). In one or more embodiments, the trades between the user (103) and the trading partners (102) are tracked by the business logic module (150) according to business transaction workflows and are recorded in the FMA (140) as business workflow transactions. TABLE 1 shows examples of types of business workflow transactions.

Table 1
Invoice
Payment
Estimate
Credit Memo
Sales Receipt
Refund Receipt
Purchase
Check
Bill
Bill Payment
Purchase Order
Vendor Credit Credit Card Credit
Time Activity
Deposit
General Ledger Entry
Transfer In one or more embodiments of the invention, the business logic module (150) is further configured to post transaction records in the accounting ledger (148), which is a summary list of posted transactions. For example, the posted transaction record A (144) is posted under the target account A (145) that is manually assigned by the user (103) via the user review module (149). In contrast, the posted transaction record B (144) is posted under the target account B (147) that is automatically extracted by the rule based analyzer (148). In one or more embodiments, the transaction records obtained from the eCommerce service providers (160) and the ECAs (101) are matched to the business workflow transactions before being posted in the account ledger. In particular, the transaction records correspond to payments for settling the trades that are recorded in the FMA (140) as the business workflow transactions. Accordingly, the transaction attributes extracted/inferred from the ECA-specific content of the staged transaction record are applied to the business workflow transactions for posting in the accounting ledger.

Typically, the posted transactions in the accounting ledger (148) are stored as dated lines with a credit column, a debit column, a beginning monetary balance, and an ending monetary balance for each account. For example, the accounting ledger (148) may be a sales ledger recording accounts receivable, a purchase ledger recording account payable, or a general ledger recording information in various accounts, such as assets, liabilities, income, expenses, and equity. The accounts used in the accounting ledger (148) are defined by the chart-of-accounts (141). Specifically, a chart-of-accounts is a created list of the accounts (e.g., the target account A (145) and target account B (147)) used by a business entity to define each class of items for which funds are spent or received. For example an account may be a bank account, fixed asset account, expense account, income account, liability account, etc. In addition, the a chart-of-accounts defines the type of each account and how that account is treated on the balance sheet and statement of activity for the business entity. In particular, the chart-of-accounts is used to organize the finances of the business entity and to segregate expenditures, revenue, assets and liabilities in order to provide interested parties a better understanding of the financial status of the business entity. Further, the FMA (140) uses the business logic module (150) to generate various financial documents (e.g., financial document (143)), such as an invoice, tax return, etc. based on the accounting ledger (148).

In one or more embodiments of the invention, the FMA (140) uses the method described in reference to FIG. 2 below to process and post the transaction records obtained from the eCommerce service provider (160) and the ECAs (101).

FIG. 1B shows additional details of the standard transaction record (155), staged transaction record (153), and posted transaction record A (144) depicted in FIG. 1A. As shown in FIG. 1B, the standard transaction record (155) includes the date (155a), amount (155b), and description (155c). The staged transaction record (153) includes the date (153a), amount (153b), and ECA-specific content (153c), with extracted attributes of target account (153x), P/L account (153y), transaction type (153z), and class/location (153w). As noted above, the target account (153x), P/L account (153y), transaction type (153z), and class/location (153w) correspond to data fields defined by the aforementioned APIs of the FMA (140). In particular, the target account (153x), P/L account (153y), transaction type (153z), and class/location (153w) are extracted and/or inferred from the ECA-specific content (153c) by the rule based analyzer (148) depicted in FIG. 1A. The posted transaction record A (144) include the date (144a), amount (144b), target account (144x), P/L account (144y), transaction type (144z), and class/location (144w).

For example, two products are configured in the FMA (140):

1. A widget, the income account on the widget item is set to "product sales" and is of type income, the expense (COGS) account is set to "COGS" and is of type expense. The widget is an inventory item and has the inventory asset account set to "Inventory Asset" of type asset.

2. A gift card, the income account on the gift card item is set to "outstanding gift cards" and is of type liability and has no COGS account and is not an inventory item.

A sales receipt is created where a customer has purchased a widget for $100 and a gift card for $100. An example of the sales receipt is shown in TABLE 2.

TABLE 2

Customer: Bob Ko
Payment Method: Paypal
Lines:

| Item | Description | Qty | Price | Amount |
|---|---|---|---|---|
| Widget | <description of widget> | 1 | 100 | 100 |
| Gift Card | Gift card | 1 | 100 | 100 |
| | Subtotal: | | | 200 |
| | Sales Tax | | | 0 |
| | Shipping: | | | 0 |
| | Total | | | 200 |

When the pushed transaction record of the PayPal™ payment is analyzed and accepted, the following posted transactions are posted in the accounting ledger:
A Credit to "Product Sales" of 100
A Credit to "Outstanding Gift Cards" of 100
A Debit to "Undeposited Funds" of 200
A Credit to the Inventory Asset account for the cost of the oldest widget in inventory (e.g., $50)
A Debit to the COGS account for the cost of the oldest widget in inventory (e.g., $50)

An example of displaying the staged transaction records in the user review window where a reviewer user may accept a staged transaction record for posting in the accounting ledger as a posted transaction record is shown in FIG. 3 below.

TABLE 3 shows an example of a transaction record obtained from the ECA A (101a), which is PayPal™ in this particular example. The portion highlighted in bold of the transaction record corresponds to the date (153a) and amount (153b), while the remainder portion corresponds to the ECA-specific content (153c). Based on the example of TABLE 3, the rule based analyzer (148) infers the transaction type (153z) as "credit card processing fee" from the ECA-specific content (153c) using an example rule, shown in TABLE 4, selected from the ECA-specific transaction record analysis rules (163).

In comparison, TABLE 5 shows another example of a transaction record obtained from the ECA B (101b), which is Amex™ in this particular example. Similar to the example in TABLE 3, the portion highlighted in bold of the transaction record corresponds to the date (153a) and amount (153b), while the remainder portion corresponds to the ECA-specific content (153c). Based on the example of TABLE 5, the rule based analyzer (148) infers the target account (153x) as "Landscaping Supplies" from the ECA-specific content (153c) using an example rule, shown in TABLE 6, selected from the ECA-specific transaction record analysis rules (163). In addition, rule based analyzer (148) determines that the user review may be skipped and the transaction record with the inferred target account "Landscaping Supplies" may be provided to the business logic module (150) for automatic posting in the accounting ledger under the target account "Landscaping Supplies."

In summary, TABLE 3 and TABLE 5 show that the completeness of ECA-specific content, based on the API-defined list of data fields, vary among different ECAs.

TABLE 3

```
{
  "AccountRef": {
      "value": "115",
      "name": "PayPal"
  },
  "PaymentType": "Cash",
  "EntityRef": {
      "value": "348",
      "name": "PayPal",
      "type": "Vendor"
  },
  "TotalAmt": 1.46,
  "DocNumber": "8TH1657469390111L",
  "TxnDate": "2015-05-18",
  "PrivateNote": "Fee for PayPal Transaction (Reference:
PayPal Transaction # 8TH1657469390111L)",
  "Line": [
      {
         "Description": "Fee for PayPal Transaction",
         "Amount": 1.46,
      }
  ],
  "TxnSource": "PayPal"
}
```

TABLE 4

```
If (TxnSource == "PayPal" && Line.Description =~ /.*fee.*/) THEN
Set Line.AccountRef to "{'value':102, 'name':'Credit Card
Processing Fees: Paypal Charges'}"
Set "BillableStatus" to "NotBillable"
Set TaxCodeRef to "NON"
   ECA-
```

TABLE 5

```
{
  "AccountRef": {
      "value": "110",
      "name": "AMEX Business Gold Rewards Card"
  },
  "PaymentType": "Credit Card",
  "EntityRef": {
      "name": "*****Home Dep #5823, 95054****",
  },
  "TotalAmt": 546.23,
  "TxnDate": "2015-04-23",
  "Line": [
      {
         "Description": "Supplies for fountain install",
         "Amount": 546.23,
         "DetailType": "AccountBasedExpenseLineDetail",
```

TABLE 5-continued

```
         "AccountBasedExpenseLineDetail": {
            "CustomerRef": {
               "name": "Peter Vogel",
               "id": "327",
               "type": "customer"
            }
            "BillableStatus": "Billable",
         }
      }
  ],
  "TxnSource": "AMEX"
```

TABLE 6

```
IF (TxnSource == "AMEX" && EntityRef.name == "Home Depot")
THEN Set Line.AccountRef to {'value': 112, 'name': "Landscaping
Supplies"}
Set BillableStatus to "Billable"
Set TaxCodeRef to "NON"
IF (Amount < 1000) THEN
SKIP REVIEW
```

Figure 2:
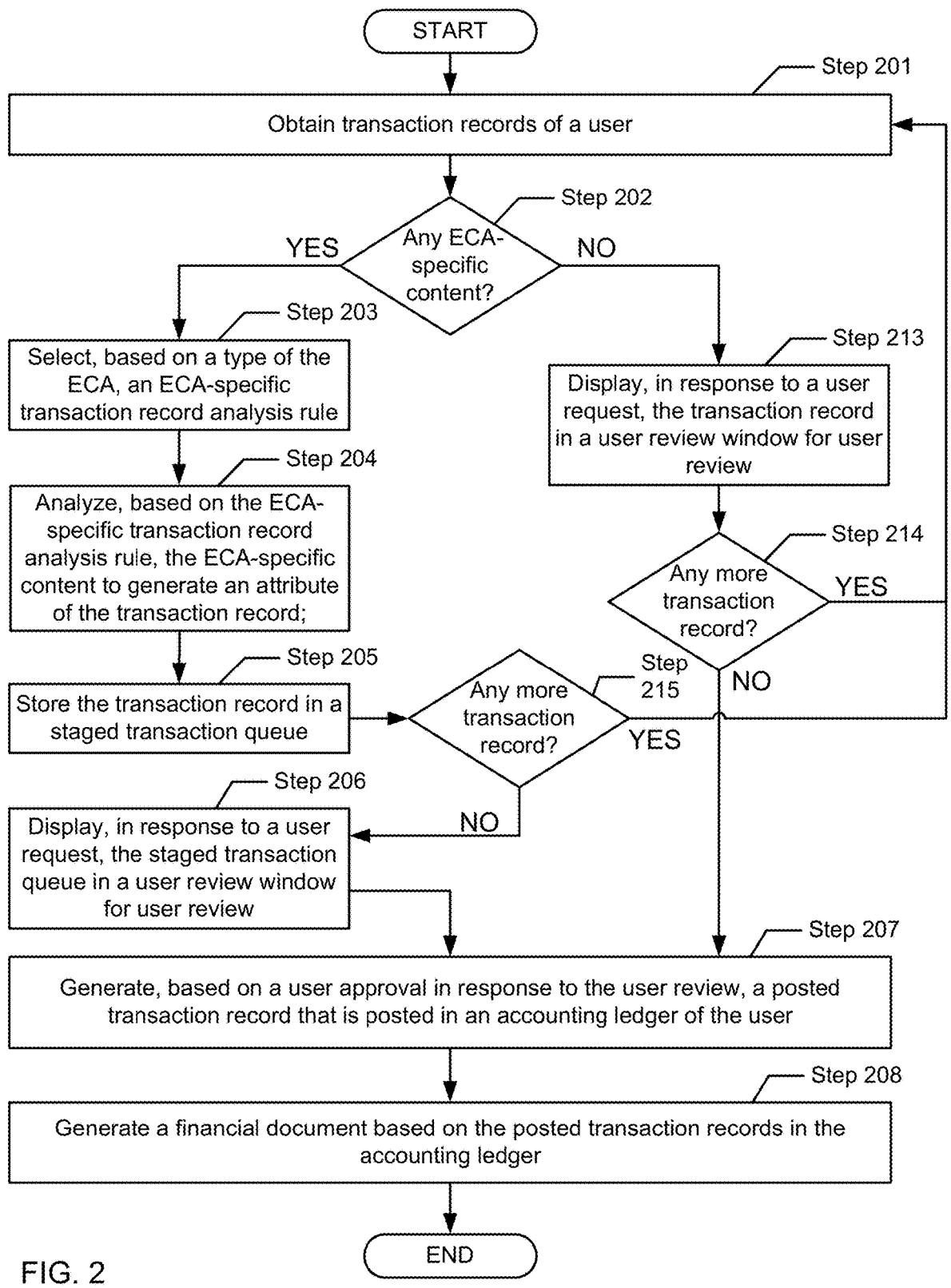
FIG. 2 shows a flowchart in accordance with one or more embodiments of the invention.

FIG. 2 shows a flowchart in accordance with one or more embodiments of the invention. In one or more embodiments of the invention, the method of FIG. 2 may be practiced using the system (100) described in reference to FIG. 1A above. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

Initially, in Step 201, a transaction record of a user is obtained. In one or more embodiments of the invention, the transaction record is downloaded from a financial institution during an online session. For example, the online session may be an online banking session when the user interacts with a website of a bank (i.e., financial institution). In this example, the transaction record is downloaded from the website of the bank using an Internet browser. In one or more embodiments of the invention, the transaction record is pushed from an electronic commerce application (ECA).

In Step 202, a determination is made as to whether the transaction record contains any ECA-specific content. If the determination is negative, i.e., the transaction record does not contain any ECA-specific content, the method proceeds to Step 213.

In Step 213, the transaction record is displayed in a user review window of a financial management application (FMA) for user review. In one or more embodiments of the invention, the transaction record is downloaded from a bank and includes a date, an amount, and a description. To complete the transaction for posting in the accounting ledger, the user manually determines an attribute (e.g., one or more of a transaction type, a target account, a profit/loss account, a class, a location, an auto-accept status, and a billable status) of the transaction record. The attribute is added to the transaction record and displayed together in the user review window. In one or more embodiments, multiple transaction records downloaded during a single online banking session are displayed contemporaneously in response to a user request.

In Step 214, a determination is made as to whether any additional transaction record remains to be obtained. If the determination is positive, i.e., at least one more transaction record remains to be obtained, the method returns to Step

201. If the determination is negative, i.e., no more transaction remains to be obtained, the method proceeds to Step 207.

Returning to the condition discussed in Step 202, if the determination is positive, i.e., the transaction record contains ECA-specific content, the method proceeds to Step 203.

In Step 203, an ECA-specific transaction record analysis rule is selected from a set of transaction record analysis rules. In one or more embodiments, the transaction record containing ECA-specific content is being pushed from an ECA. In such embodiments, the ECA-specific transaction record analysis rule is selected based on the type of the ECA.

In Step 204, based on the ECA-specific transaction record analysis rule, the ECA-specific content is analyzed to generate and/or infer an attribute of the transaction record. In one or more embodiments, the transaction record, in particular the ECA-specific content, is compared to eCommerce trading data tracked by the FMA to identify any match. In such embodiments, the attribute may be extracted/inferred from matched eCommerce trading data as part of the analysis.

In Step 205, the transaction record and the attribute are stored together in a staged transaction queue.

In Step 215, a determination is made as to whether any additional transaction record is being pushed from the ECA. If the determination is positive, i.e., at least one more transaction record is being pushed, the method returns to Step 201. If the determination is negative, i.e., no more transaction remains to be pushed, the method proceeds to Step 206.

In Step 206, in response to a user request, the staged transaction queue is displayed in the user review window of the FMA for user review. In one or more embodiments, multiple transaction records stored in the staged transaction queue are displayed contemporaneously in response to a user request.

In Step 207, based on a user approval in response to the user review of the bank feed, a posted transaction record is generated from each approved transaction record and approved attribute. In one or more embodiments of the invention, the posted transaction record is posted in an accounting ledger of the user that is maintained by the FMA.

In Step 208, the financial document is generated by the FMA based at least on the posted transaction record.

FIG. 3 shows an example in accordance with one or more embodiments of the invention. The example may be practiced based on the system (100) and the method flow chart depicted in FIG. 1A and FIG. 2, respectively. Specifically, FIG. 3 shows a screenshot (300) of the bank feed user interface window of the FMA (140) described in reference to FIG. 1A above.

An example of the aforementioned user review window is a bank feed user interface that allows the user to review basic bank-statement level data (i.e., sate, amount, and description) in the downloaded transaction records, match the downloaded transaction records against eCommerce trading data already in the FMA, and create new transactions to reflect unmatched transaction records downloaded from a financial institution. For example, a debit card transaction to purchase office supplies may be automatically categorized so the user may easily create an expense transaction for that debit card transaction, properly categorized as an office expense. Accountants and business users can quickly and easily define rules that get applied to transactions downloaded from the financial institutions.

Another example of the aforementioned user review window is an enhanced bank feed user interface that is extended to allow an ECA (not just a bank or other financial institution) to provide more detailed information about a transaction, such as the items that were sold, to whom they were sold, and how much sales tax was collected. In particular, the ECA may provide (e.g., push) the detailed transaction information based on an incomplete portion of the API-defined list of data fields without providing specifics of what income/expense/inventory asset account to use for posting the transaction, whether or not the transaction qualifies as an inventory item for the business, what sales tax code to apply for the sales tax collected so that the liabilities are tracked to the correct tax agencies, and whether the customer is an existing or new customer. When the user review these "staged" transactions in the enhanced bank feed user interface, the same categorization and rules pipeline applied to transaction records downloaded from the financial institutions are also applied to the staged transactions to reduce the effort for the user. For example, certain staged transaction records may be automatically accepted based on a user-defined rule. The remaining staged transaction records that still require manual data, or for which the user-defined rule indicating review is needed, are shown by default in the enhanced bank feed interface. The user (e.g., small business owner, book keeper or accountant) can review and edit staged transaction records before posting to the accounting ledger. As the user gains experience with reviewing the staged transaction records, additional rules are defined to automatically accept staged transaction records to the accounting ledger.

As shown in FIG. 3, when the action button "new transactions (311)" is activated, the enhanced bank feed user interface window displays the staged transaction queue containing staged transaction records originated from the ECA "XYZ eCommerce Payment Service." For example, the staged transaction queue includes the staged transaction (301) shown as one line in the screenshot (300). Similarly, other staged transaction records are displayed as additional lines in the screenshot (300). Further, the multiple displayed lines of the staged transaction records form the date column (310), description column (320), category/match column (330), amount column (340), and action column (350). As described above, the date column (310) and amount column (340) correspond to the date (153*a*) and amount (153*b*) of the staged transaction record (153) shown in FIG. 1B above. In addition, the description column (320) and category/match column (330) correspond to the transaction attributes extracted/inferred from the ECA-specific contents of the staged transactions, such as the transaction type, target account, profit/loss account, class, location, auto-accept status, billable status, etc.

Further as shown in FIG. 3, after reviewing the displayed transaction attributes in the description column (320) and category/match column (330), the reviewer user may accept each of the staged transaction record into a posted transaction record by activating the "add" button in the action column (350). After reviewing and accepting the staged transaction records, the user may activate the action button "posted transactions (312)," to view the posted transactions in the enhanced bank feed user interface window. In addition, the user may view excluded transaction records by activating the action button "excluded transactions (313)." Accordingly, staged transaction records excluded by the reviewer user during the review are displayed in the enhanced bank feed user interface window.

Figure 4:
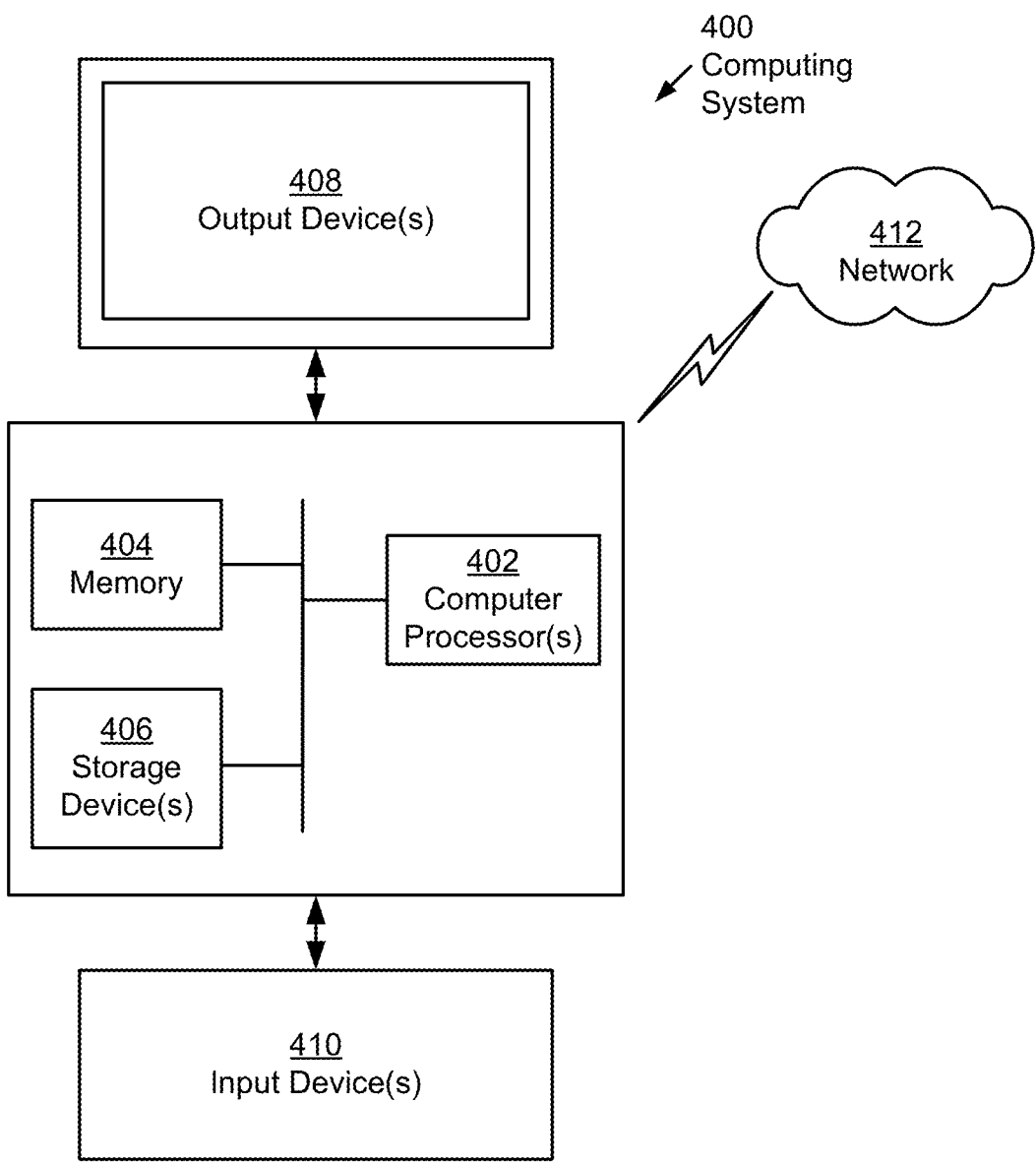
FIG. 4 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a financial document using a financial management application (FMA), comprising:
    obtaining, from a first electronic commerce application (ECA) via an application programming interface (API) of the FMA, a plurality of transaction records of a user,
        wherein a first transaction record of the plurality of transaction records comprises a first date, a first amount, and a first ECA-specific content, and
        wherein a transaction attribute is not included in the ECA-specific content by the ECA;
    selecting, based on a type of the first ECA, an ECA-specific transaction record analysis rule from a plurality of transaction record analysis rules;
    analyzing, based on the ECA-specific transaction record analysis rule, the first ECA-specific content to generate a first attribute of the first transaction record,
        wherein the first attribute corresponds to a first data field defined by the API;
    selecting, based on the type of the first ECA, a second ECA-specific transaction record analysis rule from the plurality of transaction record analysis rules;
    inferring, based on the second ECA-specific transaction record analysis rule, the transaction attribute that was not included in the ECA-specific content by the ECA to form an inferred attribute corresponding to a second data field defined by the API, wherein inferring comprises:
        selecting a rule corresponding to the second ECA from the plurality of transaction record analysis rules associated with the second ECA,
        wherein selecting is performed based on a source tag that identifies an identity of the second ECA; and
        applying the rule using a rule-based analyzer to infer the inferred attribute;
    adding the inferred attribute to the transaction record;
    storing the plurality of transaction records in a staged transaction queue, wherein the first transaction record is stored in conjunction with the first attribute;
    displaying, by the FMA in response to a user request, the staged transaction queue for user review on a mobile device, wherein the first transaction record is displayed in conjunction with the first attribute and the inferred attribute;
    generating, based on a user approval in response to the user review, a first posted transaction record from the first transaction record, wherein the first posted transaction record is posted in an accounting ledger of the user and comprises the first date, the first amount, the first attribute, and the inferred attribute; and
    generating, by the FMA, the financial document based at least on the first posted transaction record.

2. The method of claim 1, further comprising:
    obtaining, from the FMA, an electronic commerce trading data item corresponding to a first trade between the user and a first trading partner of the user, wherein the first transaction record corresponds to a first payment using the first ECA to settle the first trade; and
    comparing the first transaction record and the electronic commerce trading data item to determine a match,
    wherein analyzing the first ECA-specific content to generate the first attribute is further based on the match,
    wherein displaying the staged transaction queue comprises displaying the match, and
    wherein the user approval comprises a user verification of the match.

3. The method of claim 2, further comprising:
analyzing, based on the ECA-specific transaction record analysis rule, a second ECA-specific content in a second transaction record of the plurality of transaction records to generate a second attribute of the second transaction record,
 wherein the second attribute corresponds to a second data field defined by the API of the FMA, and
 wherein the second attribute comprises a billing status; and
generating, in response to displaying the staged transaction queue, a second posted transaction record from the second transaction record, wherein the second posted transaction record is posted in the accounting ledger of the user and comprises a second date, a second amount, and the second attribute,
wherein the financial document is generated by the FMA further based on the second posted transaction record, and
wherein the second transaction record corresponds to a second payment using the first ECA to settle a second trade between the user and a second trading partner of the user.

4. The method of claim 3, wherein displaying the staged transaction queue comprises:
displaying, using a single user interface window of the FMA, the first transaction record, the first attribute, the second transaction record, and the second attribute contemporaneously.

5. The method of claim 4, further comprising:
obtaining, from a financial institution, a third transaction record comprising a third date, a third amount, and a third description;
displaying, using the single user interface window of the FMA, the third transaction record;
generating, in response to displaying the third transaction and based on a user input from the user, a third attribute of the third transaction record,
 wherein the third attribute corresponds to a third data field defined by the API of the FMA, and
 wherein the third attribute comprises a profit/loss account; and
generating, based on the third attribute, a third posted transaction record from the third transaction record, wherein the third posted transaction record is posted in the accounting ledger of the user and comprises the third date, the third amount, and the third attribute,
wherein the financial document is generated by the FMA further based on the third posted transaction record.

6. The method of claim 5,
wherein the first attribute and the second attribute are generated prior to displaying the staged transaction queue in the single user interface window of the FMA, and
wherein the third attribute is generated subsequent to displaying the third transaction record in the single user interface window of the FMA.

7. A system comprising:
a computer processor;
a financial management application (FMA) executing on the computer processor and configured to generate a financial document, wherein the FMA comprises:
 a rule based analyzer configured to:
  obtain, from a first electronic commerce application (ECA) via an application programming interface (API) of the FMA, a plurality of transaction records of a user,
   wherein a first transaction record of the plurality of transaction records comprises a first date, a first amount, and a first ECA-specific content, and
   wherein a transaction attribute is not included in the ECA-specific content by the ECA;
  select, based on a type of the first ECA, an ECA-specific transaction record analysis rule from a plurality of transaction record analysis rules;
  analyze, based on the ECA-specific transaction record analysis rule, the first ECA-specific content to generate a first attribute of the first transaction record,
   wherein the first attribute corresponds to a first data field defined by the (API) of the FMA; and
  select, based on the type of the first ECA, a second ECA-specific transaction record analysis rule from the plurality of transaction record analysis rules;
  inferring, based on the second ECA-specific transaction record analysis rule, the transaction attribute that was not included in the ECA-specific content by the ECA to form an inferred attribute corresponding to a second data field defined by the API, wherein inferring comprises;
   selecting a rule corresponding to the second ECA from the plurality of transaction record analysis rules associated with the second ECA,
    wherein selecting is performed based on a source tag that identifies an identity of the second ECA; and
   applying the rule using a rule-based analyzer to infer the inferred attribute;
  add the inferred attribute to the transaction record;
  store the plurality of transaction records in a staged transaction queue, wherein the first transaction record is stored in conjunction with the first attribute;
 a user review module configured to:
  display, in response to a user request, the staged transaction queue for user review on a mobile device, wherein the first transaction record is displayed in conjunction with the first attribute and the inferred attribute; and
 a business logic module configured to:
  generate, based on a user approval in response to the user review, a first posted transaction record from the first transaction record, wherein the first posted transaction record is posted in an accounting ledger of the user and comprises the first date, the first amount, the first description, and the first attribute; and
 a repository configured to store the staged transaction queue, the accounting ledger of the user, and the plurality of transaction record analysis rules.

8. The system of claim 7, wherein the rule based analyzer is further configured to:
obtain, from the FMA, an electronic commerce trading data item corresponding to a first trade between the user and a first trading partner of the user, wherein the first transaction record corresponds to a first payment using the first ECA to settle the first trade; and
compare the first transaction record and the electronic commerce trading data item to determine a match,
wherein analyzing the first ECA-specific content to generate the first attribute is further based on the match, wherein displaying the staged transaction queue comprises displaying the match, and wherein the user approval comprises a user verification of the match.

9. The system of claim 8, wherein the rule based analyzer is further configured to analyze, based on the ECA-specific transaction record analysis rule, a second ECA-specific content in a second transaction record of the plurality of transaction records to generate a second attribute of the second transaction record, wherein the second attribute corresponds to a second data field defined by the API of the FMA, and wherein the second attribute comprises a billing status, wherein the business logic module is further configured to generate, in response to displaying the staged transaction queue, a second posted transaction record from the second transaction record, wherein the second posted transaction record is posted in the accounting ledger of the user and comprises a second date, a second amount, and the second attribute, wherein the financial document is generated further based on the second posted transaction record, and wherein the second transaction record corresponds to a second payment using the first ECA to settle a second trade between the user and a second trading partner of the user.

10. The system of claim 9, wherein displaying the staged transaction queue comprises:

displaying, using a single user interface window of the FMA, the first transaction record, the first attribute, the second transaction record, and the second attribute contemporaneously.

11. The system of claim 10, wherein the rule based analyzer is further configured to obtain, from a financial institution, a third transaction record comprising a third date, a third amount, and a third description, wherein the user review module is further configured to:
display, using the single user interface window, the third transaction record; and
generate, in response to displaying the third transaction and based on a user input from the user, a third attribute of the third transaction record,
wherein the third attribute corresponds to a third data field defined by the API of the FMA, and
wherein the third attribute comprises a profit/loss account, and wherein the business logic module is further configured to:
generate, based on the third attribute, a third posted transaction record from the third transaction record, wherein the third posted transaction record is posted in the accounting ledger of the user and comprises the third date, the third amount, and the third attribute, and wherein the financial document is generated by the FMA further based on the third posted transaction record.

12. The system of claim 5, wherein the first attribute and the second attribute are generated prior to displaying the staged transaction queue in the single user interface window of the FMA, and wherein the third attribute is generated subsequent to displaying the third transaction record in the single user interface window of the FMA.

13. A non-transitory computer readable medium storing instructions for generating a financial document using a financial management application (FMA), the instructions, when executed by a computer processor, comprising functionality for:

obtaining, from a first electronic commerce application (ECA) via an application programming interface (API) of the FMA, a plurality of transaction records of a user,
wherein a first transaction record of the plurality of transaction records comprises a first date, a first amount, and a first ECA-specific content, and
wherein a transaction attribute is not included in the ECA-specific content by the ECA;

selecting, based on a type of the first ECA, an ECA-specific transaction record analysis rule from a plurality of transaction record analysis rules;

analyzing, based on the ECA-specific transaction record analysis rule, the first ECA-specific content to generate a first attribute of the first transaction record,
wherein the first attribute corresponds to a first data field defined by the API of the FMA;

selecting, based on the type of the first ECA, a second ECA-specific transaction record analysis rule from the plurality of transaction record analysis rules;

inferring, based on the second ECA-specific transaction record analysis rule, the transaction attribute that was not included in the ECA-specific content by the ECA to form an inferred attribute corresponding to a second data field defined by the API, wherein inferring comprises:
selecting a rule corresponding to the second ECA from the plurality of transaction record analysis rules associated with the second ECA,
wherein selecting is performed based on a source tag that identifies an identity of the second ECA; and
applying the rule using a rule-based analyzer to infer the inferred attribute;

adding the inferred attribute to the transaction record;

storing the plurality of transaction records in a staged transaction queue, wherein the first transaction record is stored in conjunction with the first attribute;

displaying, by the FMA in response to a user request, the staged transaction queue for user review on a mobile device, wherein the first transaction record is displayed in conjunction with the first attribute and the inferred attribute;

generating, based on a user approval in response to the user review, a first posted transaction record from the first transaction record, wherein the first posted transaction record is posted in an accounting ledger of the user and comprises the first date, the first amount, the first attribute, and the inferred attribute; and generating, by the FMA, the financial document based at least on the first posted transaction record.

14. The non-transitory computer readable medium of claim 13, the instructions, when executed by the computer processor, further comprising functionality for:

obtain, from the FMA, an electronic commerce trading data item corresponding to a first trade between the user and a first trading partner of the user, wherein the first transaction record corresponds to a first payment using the first ECA to settle the first trade; and comparing the first transaction record and the electronic commerce trading data item to determine a match,
wherein analyzing the first ECA-specific content to generate the first attribute is further based on the match, wherein displaying the staged transaction queue comprises displaying the match, and
wherein the user approval comprises a user verification of the match.

15. The non-transitory computer readable medium of claim 14, the instructions, when executed by the computer processor, further comprising functionality for:
analyzing, based on the ECA-specific transaction record analysis rule, a second ECA-specific content in a second transaction record of the plurality of transaction records to generate a second attribute of the second transaction record,
wherein the second attribute corresponds to second data field defined by the API of the FMA, and
wherein the second attribute comprises a billing status; and
generating, in response to displaying the staged transaction queue, a second posted transaction record from the second transaction record, wherein the second posted transaction record is posted in the accounting ledger of the user and comprises a second date, a second amount, and the second attribute,
wherein the financial document is generated by the FMA further based on the second posted transaction record, and
wherein the second transaction record corresponds to a second payment using the first ECA to settle a second trade between the user and a second trading partner of the user.

16. The non-transitory computer readable medium of claim 15, wherein displaying the staged transaction queue comprises:
displaying, using a single user interface window of the FMA, the first transaction record, the first attribute, the second transaction record, and the second attribute contemporaneously.

17. The non-transitory computer readable medium of claim 16, the instructions, when executed by the computer processor, further comprising functionality for:
obtaining, from a financial institution, a third transaction record comprising a third date, a third amount, and a third description;
displaying, using the single user interface window of the FMA, the third transaction record;
generating, in response to displaying the third transaction and based on a user input from the user, a third attribute of the third transaction record,
wherein the third attribute corresponds to a third data field defined by the API of the FMA, and
wherein the third attribute comprises a billing status; and
generating, based on the third attribute, a third posted transaction record from the third transaction record, wherein the third posted transaction record is posted in the accounting ledger of the user and comprises the third date, the third amount, and the third attribute,
wherein the financial document is generated by the FMA further based on the third posted transaction record.

* * * * *